US012504005B2

(12) United States Patent
Martensen et al.

(10) Patent No.: US 12,504,005 B2
(45) Date of Patent: Dec. 23, 2025

(54) TEMPORARY ENCLOSURE FOR AT LEAST A PART OF A ROTOR BLADE

(71) Applicant: PP Energy Aps, Nordborg (DK)

(72) Inventors: Lars Martensen, Sønderborg (DK); Jesper Ankjær Pedersen, Kolding (DK); Peter Moos Junker, Kolding (DK)

(73) Assignee: PP ENERGY APS, Nordborg (DK)

( * ) Notice: Subject to any disclaimer, the term of this patent is extended or adjusted under 35 U.S.C. 154(b) by 0 days.

(21) Appl. No.: 18/917,552

(22) Filed: Oct. 16, 2024

(65) Prior Publication Data

US 2025/0035089 A1    Jan. 30, 2025

Related U.S. Application Data

(63) Continuation of application No. 18/247,401, filed as application No. PCT/EP2021/081137 on Nov. 9, 2021, now Pat. No. 12,196,181.

(30) Foreign Application Priority Data

Nov. 10, 2020   (EP) ..................................... 20206653

(51) Int. Cl.
   *F03D 80/50*   (2016.01)
(52) U.S. Cl.
   CPC .................................. *F03D 80/50* (2016.05)
(58) Field of Classification Search
   CPC ...... F03D 80/50; F03D 80/001; F03D 80/501; F03D 80/502; F03D 80/504; F03D 80/505; F03D 80/507; F03D 80/509; F03D 17/001; F03D 17/002; F03D 17/003; F03D 17/004; F03D 13/40; B65D 21/086
   See application file for complete search history.

(56) References Cited

U.S. PATENT DOCUMENTS

| 2,118,330 | A | 5/1938 | Ernest | |
|---|---|---|---|---|
| 8,490,749 | B2 | 7/2013 | Teichert | |
| 10,801,220 | B2* | 10/2020 | Oowaku | E04G 3/30 |
| 2007/0007074 | A1* | 1/2007 | Lemburg | F03D 80/50 182/128 |
| 2008/0302605 | A1* | 12/2008 | St-Germain | E04G 1/362 182/223 |
| 2011/0303488 | A1* | 12/2011 | Besselink | E04G 3/30 182/142 |
| 2017/0030327 | A1* | 2/2017 | Fletcher | F03D 80/50 |

(Continued)

FOREIGN PATENT DOCUMENTS

DE   102011100912 A1   3/2012

*Primary Examiner* — Courtney D Heinle
*Assistant Examiner* — Ryan C Clark
(74) *Attorney, Agent, or Firm* — McCormick, Paulding & Huber PLLC

(57) ABSTRACT

Temporary enclosure (1) for at least a part of a rotor blade connected to a wind power plant having a tower and a rotor top part, the enclosure (1) having a framework (2); one or more walls (3); a roof (4); said roof extends from said wall towards said blade; said framework (2) stretching said walls (3) said that a volume is enclosed below the roof (4) wherein said framework (2) includes one or more frame parts (5), a connection (6) for connection of the one or more frame parts (5) and an activation means (7) for activation a change in the framework (2) whereby the volume enclosed by the enclosure (1) change.

21 Claims, 8 Drawing Sheets

(56) References Cited

U.S. PATENT DOCUMENTS

2019/0010714 A1     1/2019  Oowaku et al.
2019/0257295 A1*    8/2019  Müller .................... F03D 80/50
2020/0171552 A1*    6/2020  Hamamura ............. F03D 80/50

* cited by examiner

TEMPORARY ENCLOSURE FOR AT LEAST A PART OF A ROTOR BLADE

CROSS-REFERENCE TO RELATED APPLICATIONS

This application is a continuation of U.S. patent application Ser. No. 18/247,401, filed Mar. 30, 2023, which is a National Stage application of International Patent Application No. PCT/EP2021/081137, filed on Nov. 9, 2021, which claims priority to European Patent Application No. 20206653.6, filed on Nov. 10, 2020, each of which is hereby incorporated by reference in its entirety.

TECHNICAL FIELD

The present invention relates to a temporary enclosure for at least a part of a rotor blade for protecting working material and or maintenance person working on a rotor blade against wind and rain.

BACKGROUND

Wind turbine blades often need inspection, service, and maintenance. Furthermore, they may be upgraded, for example with a leading-edge protection, a tip protection and/or a tip extension. In particular, the tip segment of the rotor blade is the part of the blade which is exposed to maximum speed and therefore has a need for being repaired or replaced.

For maintenance or inspection, the relevant rotor blade to be maintained is positioned such that its tip points down to the ground. This means that said rotor blade is in a substantially vertical position (maintenance position). The machinery and technicians can be lifted and lowered along the rotor blade.

Machinery and or technicians must be able to reach and work on the specific relevant sites of the mounted rotor blades. For this purpose, different machinery has been proposed. For example, a robot has been proposed in EP3485162 A1, service technicians are rappelling up and down the blade or using different types of platforms for example, a chair like platform EP2414671 A1 or working platforms with space for more than one service technicians like the working platform proposed in DE102011100912 A1.

Many inspection and repair measures must be carried out in a protected environment. It is often necessary that the relevant areas are protected from rain. For some repair measures, even a special temperature range must be ensured. Different habitat solutions have been developed in order shelter technicians, their equipment and the maintenance areas from rain.

A temporary maintenance enclosure for the maintenance of at least part of a turbine blade is described in US2019/0162172 A1, the enclosure comprises a platform with an enclosure comprising at least one inflatable wall and a roof carried by said platform.

A further enclosure is disclosed in the German utility model DE20 2009 002 054 U1. The encloser disclosed comprising a skeleton consisting of parallel placed rings and an outer sheath.

However, with the known solutions sheltering, sheltering the same volume size at tip as at the root is not an optimal sheltering for the new developed rotor blades.

In recent years, wind turbines have grown significantly in size and the outer shape of the rotor blades has changed to a complex structure. Not only the thickness and the width change from the hub end to the tip end and from the leading edge to the trailing edge. The blade may also be pre-bent, angled, and/or twisted.

As noted above, rotor blades are often of a very sophisticated shape. Their shape changes in a complex manner from its inner end mounted on the hub to its outer tip in order to achieve a low weight and optimal flow characteristics. Unfortunately, this complicates the maintenance and there is a growing demand for a more optimal enclosure for servicing all the way from the mounting end of the blade to the tip end.

SUMMARY

An object underlying the invention is to improve the protection enclosure and secure a more optimal enclosure for the service both at the tip as well as at the root and the area there between.

This object is solved by a temporary enclosure according to claim 1.

Temporary enclosure for at least a part of a rotor blade connected to a wind power plant having a tower and a rotor top part, the enclosure comprising;
   a framework
   one or more walls
   a roof; said roof extends from said wall towards said blade; said framework stretching said walls said that a volume is enclosed below the roof. The object is solved with a framework comprising one or more frame parts, a connection for connection of the one or more frame parts and activation means for activation a change in the framework whereby the volume enclosed by the enclosure change.

When such a temporary enclosure is arranged around the rotor blade and the enclosure is lifted and lowered down the rotor blade the volume enclosed by the enclosure can be adapted to the size and the form of the rotor blade. At the root, where the blade is connected to rotor top part the diameter of the rotor blade is typical larger than at the tip and the distance between the trailing-edge and the leading-edge of the rotor blade is typical also changing from a more narrow distance at the root to a broader distance and again at the tip being narrow again. This dimension change of the rotor blade together with the often very sophisticated shape can be handled with the enclosure by activation a change in the framework whereby the size and form and herby the volume enclosed by the enclosure easily can be adapted to the outline of the rotor blade. The adaption of the volume when the enclosure is lifted and lowered has many advantages, it is an advantage that the volume is as low as possible when it comes to the influence of the wind and rain. Many working processes has also advantaged in the possibility to change the volume due to for instance heating or cooling of the air enclosed or different working process claiming different distances. An easy change in the framework with the activation means and thereby an easy change in the size and/or the form of the enclosure changes the volume enclosed by the enclosure along with the lowering and lifting and is therefore of great value. A change in the framework, whereby the volume enclosed by the enclosure change, should be understood as a change of the size and/or the form of the framework and hereby the change of the volume enclosed by the enclosure.

The term walls should be understood as vertical sidewalls. The volume enclosed by the enclosure is the volume surrounded by the walls. When the activation means change the framework the volume surrounded by the walls change form and/or size.

In an embodiment of the invention at least one frame part has a telescopic form. It is possible that the whole frame part is build as a telescopic form or a telescopic part is integrated into the frame part. With a telescopic form it is easy to prolong and shorten the frame part and thereby increase and decrease the size and volume of the enclosure depending of the need when the enclosure is lifted and lowered along the rotor blade.

When the telescopic form changes the length of the frame part the size of the walls changes as well and there by the surrounded volume, the volume enclosed by the enclosure.

In an embodiment of the invention the framework of the temporary enclosure comprises at least two frame parts. More than one frame parts has the advantage that the enclosure not only can change the size but also the form and thereby be more efficient. The actuation means can narrow and enlarge the size and form of the framework and thereby the enclosure depending on the outer dimension of the rotor blade and the enclosure can at all time take the most favorable volume/size rapidly and without the need of lowering the enclosure to the ground in order to make the change in size.

In an embodiment of the invention at least one connection for connection of the frame parts is a pivotable connection. With at least one pivotable connection between the frame parts is it possible to change the angle between the frame parts and thereby change the volume enclosed by the enclosure.

When the connection of the frame parts is a pivotable connection, the walls stretch by the framework pivot in relation to each other and the volume surrounded by the walls change form and/or size.

In an embodiment of the invention the framework comprises at least three frame parts. With three frame parts a triangular form is build and the enclosure can be adapted to the form of the rotor blade.

In an embodiment of the invention the framework comprises at least four frame parts.

With four frame part a more classical form is build. The framework may comprise more than four frame parts. An increasing amount of frame parts secure a more flexible framework and thereby a more flexible enclosure with greater possibility to adapted to the sophisticated change of the rotor blade both in the longitudinal direction as well as the sophisticated form in the horizontal direction.

In an embodiment of the invention the framework comprises at least four frame parts where at least four of the frame parts having a telescopic form in order to change both the length and the width of the framework.

In an embodiment of the invention the framework comprises at least one frame part that can be divided into two sub-frame parts and the sub-frame parts can be moved away from each other and the framework can be opened. This allows the blade to enter the framework, and after entering of the blade the two sub-frame parts can be closed and fixed together in a closed configuration.

In an embodiment of the invention at least one of the connections of frame parts can be disconnected, and the framework can be opened. This allow the blade to enter the framework after entering of the blade the two frame parts can be connected again and sub-frame parts can be closed and fixed together in a closed configuration.

In an embodiment of the invention the framework comprises at least four frame parts connected with pivotable connections. Hereby is it possible to change the form of the enclosure. With four or more frame parts connect with pivotable connection and telescopic frame parts an even more flexible enclosure is build.

In an embodiment of the invention the activations means is an actuator. It is possible to use many different types of actuators both hydraulic, pneumatic, electrical or simpler mechanical. Preferable a linear electrical actuator is used or mechanical actuator like a rack and pinion steering or a simpler manual steering like for example a wire steering.

The activation means may change the framework into at least two different sizes or forms. Preferably the activations mean can change the framework into at least three different step and thereby forms at least three different size or forms. Even more preferably the activation means can enable a variable changing of the framework.

The framework maybe builds with only one common actuator to actuate all changes in the pivotable connections as well as changes in the telescopic frame parts. In one embodiment one actuator placed in connection with one pivotable connection can actuate the change of all pivotable connections. It is preferable that each telescopic frame part has its own actuator.

In an embodiment of the invention at least one wall is movable. The wall can be movable in many ways like for example a foldable wall or like a curtain that could be pulled or pushed to the right or to the left or like a roller blind. The wall can also be like a sliding door. The movable wall gives access to the inside of the enclosure.

The wall can also be constructed with parts of the wall that can be opened like a window that can be opened. A part of the wall can also be made of a transparent material that allows daylight into the enclosure and gives the possibilities to look into the enclosure from the outside.

In an embodiment of the invention the enclosure comprises more than one wall and each wall have its own frame part. An example of this are four walls stretched by four frame parts. The walls and the frame parts can depend on the material also be constructed as one part. If the wall is made of a rigid sheet material it would also be possible that part of the wall or some of the walls could function as a frame part.

The wall maybe made of a material selected among a polymer material, composite material, aluminum or steel, preferably a tarpaulin like material.

The roof maybe made of a material selected among composite material, polymer material aluminum or steel preferably a composite material.

The roof may comprise several sections that may be moved in relation to each other. A roof build in sections would allow the enclosure to be closed tighter to the rotor blade.

If the rotor blade is entered into the enclosure by lifting the enclosure from below the tip and up it will also be in favor if the roof could be opened and closed tight to the blade. The same goes if the enclosure is opened and the blade is entered into the enclosure from the side.

An extra sealing between the roof and the blade maybe inserted as an integrated or a separate part. In order to secure that no rain will enter the enclosure.

The roof and the wall maybe connected as one or more parts.

In an embodiment of the invention the enclosure comprises a platform. A working platform from where the technicians can service and maintain the rotor blade.

In an embodiment of the invention is the platform connected to the framework of the enclosure. The enclosure and the platform can be moved as one common system. The wall may be prolonged so that it will function as the balustrade for the platform.

The enclosure may comprise a floor and the platform may be total enclosed by the enclosure. The floor maybe constructed in the same way as the roof.

In an embodiment of the invention the platform and the enclosure sharing activation means. For example, the enclosure can be connected to the platform, so the enclosure is moving with the platform when the change in shape of the platform is activated. The enclosure and platform will hereby act as one unit.

In an embodiment of the invention the activation means are controlled by a common controller. For example, the activation means of the enclosure can be connected to the controller of the platform and the change in shape of the enclosure can hereby be activated by the platform controller. Activation can be performed so the enclosure moves separate from the platform or the enclosure moves synchronic with the platform.

The enclosure and platform are here sharing activations means and the activation means is controlled by a common controller. A service technician can in an easy way hoist the enclosure with the platform up and down depending of the work to be done and the enclosure, and platform will change form and size depending on the change in the framework. The enclosure and platform can be adapted to the outer dimension of the rotor blade and the enclosure can at all time take the most favorable volume without the need of lowering the enclosure to the ground in order to make the changes in volume.

BRIEF DESCRIPTION OF THE DRAWINGS

The invention will now be described in further details with reference to the drawings in which.

DETAILED DESCRIPTION

Figure 1A:
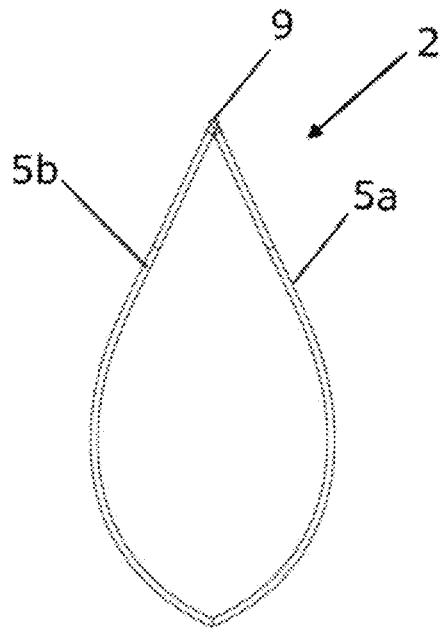
FIGS. 1a-1c Show schematic illustrations of an embodiment with two frame parts.
Figure 1B:
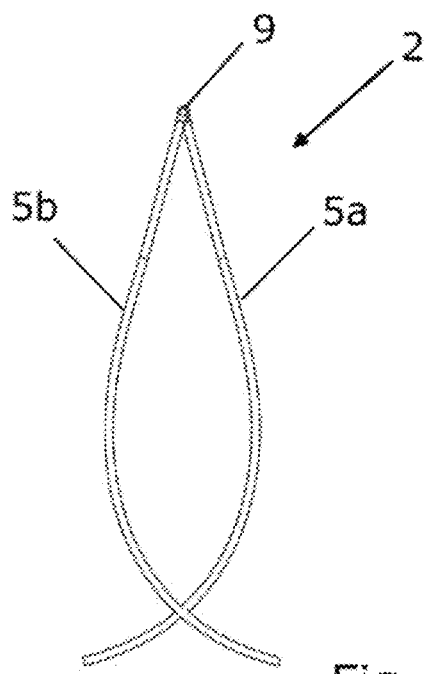
Figure 1C:
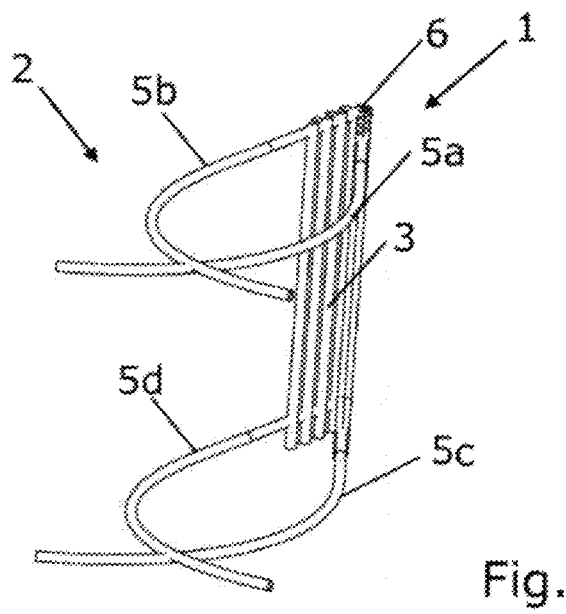

FIG. 1 schematically shows an embodiment of the enclosure with two frame parts 5 (5a, 5b). FIG. 1a and FIG. 1b shows the enclosure from the top side and down, as seen from the top of a wind power plan and down. The illustration is without the roof and without walls in order to illustrate how the two frame parts 5 are connected and how the framework can change form and size. FIG. 1c illustrate the same enclosure 1 seen from the side and with wall 3. The two frame parts 5 have arc form and are connected in a pivotable connection 9. FIG. 1b illustrate how the framework 2 looks like when the two frame parts 5 are pivoted away from each other and a large areal between the two frame parts is formed. FIG. 1a. illustrate the same framework 2 in the narrow situation where the two frame parts 5 are pivoted and having an overlap and a small areal is formed between the two frame parts 5. The enclosure disclosed can be used in two ways it can be hoisted from the ground and the rotor blade can enter the enclosure from the tip or the frame work 2 can be opened by pivoting the two frame parts 5 away from each other and the rotor blade can enter the enclosure from the side at any height. The enclosure can take the narrow form as disclosed in FIG. 1a at the blade tip and change from narrow to large form as disclosed in FIG. 1b when hoisted up along the rotor blade. The activation means, not visible, could for example be a mechanical actuator, like for example a wire steering. The actuation means can narrow and enlarge the size of the framework and thereby the enclosure depending on the outer dimension of the rotor blade and the enclosure can at all time take the most favorable volume/size rapidly and without the need of lowering the enclosure to the ground in order to make the change in size. FIG. 1c. shows the enclosure 1 with one wall 3 attached to the framework 2. The wall 3 has form as a curtain. The curtain can be pulled out and in, depending of the need for a closed enclosure.

The wall 3 is at the bottom connected to two further frame parts 5c and 5d. The frame parts 5c and 5d have same arc forms and size as the two frame parts 5a and 5b. The frame parts 5c and 5d are also connected in a pivotable connection. 5c and 5d gives stability to the enclosure.

Figure 2A:
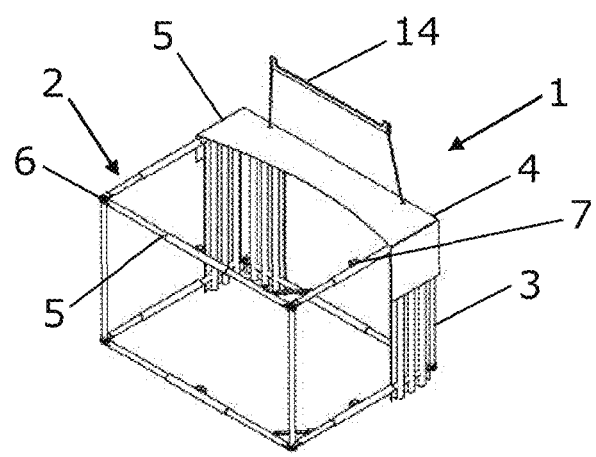
FIGS. 2a and 2b Show schematic illustrations of an embodiment with walls and roof.
Figure 2B:
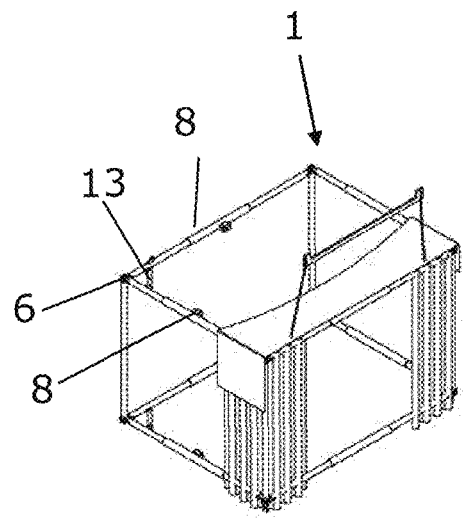

FIG. 2a and FIG. 2b illustrate another embodiment of the invention. The enclosure 1 in both FIG. 2a and FIG. 2b is the same only turned 90 degrees compared to each other. The framework 2 takes here form as a rectangle and the frame parts 5 are connected in the connections 6. A fitting 13 is placed in relation to the connection 6 in order to give stability for the connection 6. One of the frame parts in both width and length direction has a telescopic form 8. The activation means is here disclosed as an electrical linear actuator. But other types of actuators could have been selected as well. The walls 3 have form as curtains, the curtains can be pulled out and in depending of the need for a closed enclosure. Only a part of the roof 4 is disclosed. The roof 4 is divided into two parts where each part can close the gap between the walls and the rotor blade (not shown). A suspension 14 is illustrated for hoisting the enclosure up and down. The enclosure illustrated in FIG. 2a and FIG. 2b. is illustrated with a closed configuration. The enclosure is in the closed configuration hoisted from the ground and the rotor blade can enter the enclosure 1 from the tip. The walls are at the bottom connected to frame parts 5 with same dimension as at the top and also here connected and with telescopic form in both width and length direction.

Figure 3A:
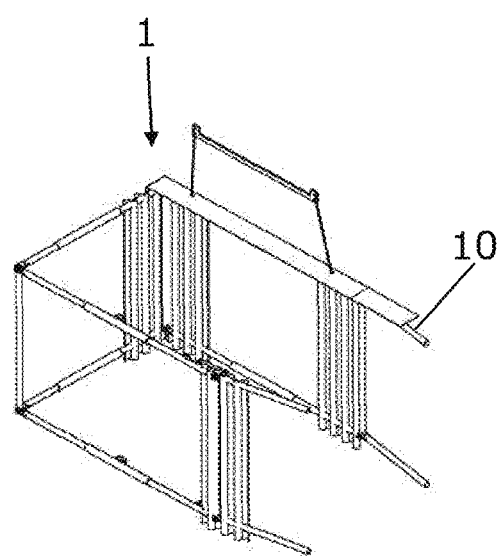
FIGS. 3a and 3b Show schematic illustrations of an embodiment with the framework open for receiving a rotor blade.
Figure 3B:
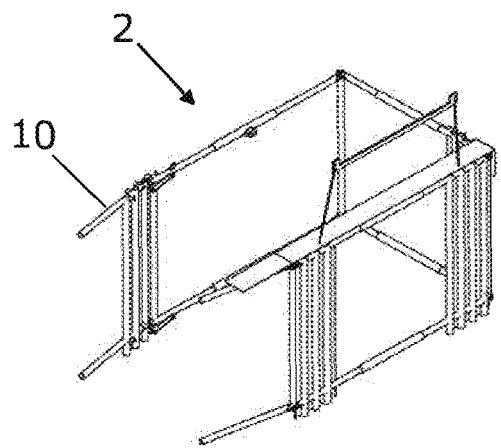

FIG. 3a and FIG. 3b illustrate an enclosure like the enclosure illustrated in FIG. 2a and FIG. 2b. The only difference is that the enclosure has a frame part that can be divided into two sub-frame parts 10 and that the sub-frame parts 10 can be moved away from each other and the framework 2 can be opened. This allows the enclosure 1 to enclose the rotor blade from the side at any height of the rotor blade. Such an enclosure gives freedom to operate in specific areas without the need of starting and ending the hoisting at the rotor blade tip.

Figure 4A:
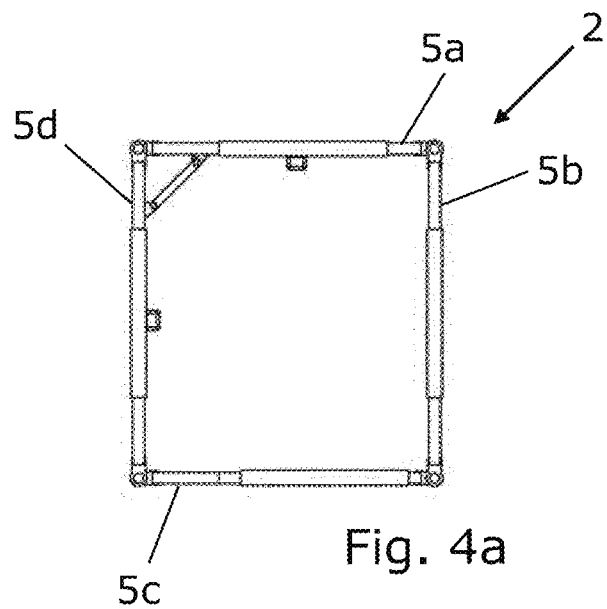
FIGS. 4a and 4b Show schematic illustrations of an embodiment with frame parts having telescopic form.
Figure 4B:
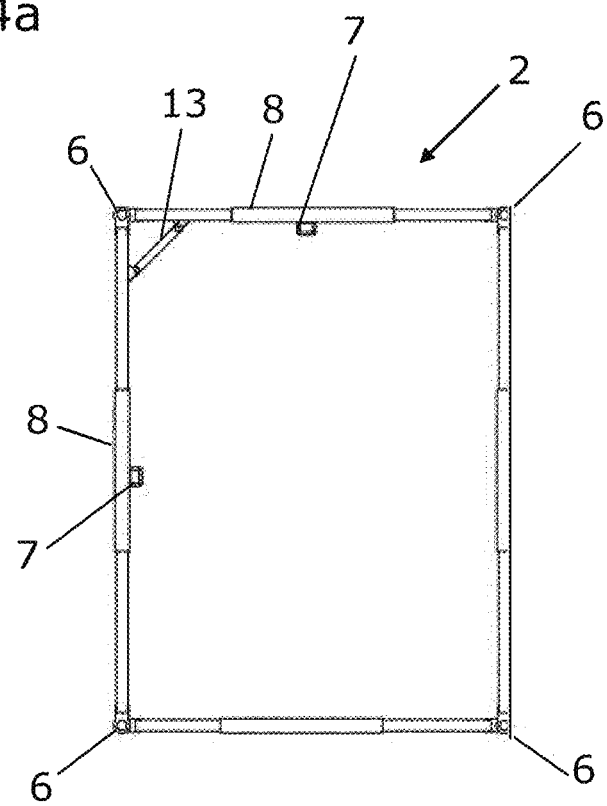

FIG. 4 illustrate the framework with four frame parts 5(a-d). FIG. 4a and FIG. 4b shows the framework from the top side and down, as seen from the top of a wind power plan and down. The illustration is without the roof and without walls in order to illustrate how the four frame parts 5(a-d) are connected and how the framework can change size.

The framework 2 takes here form as a rectangle and the frame parts 5 are connected in connections 6. A fitting 13 is placed in relation to the connection 6 in order to give stability for the connection 6. The frame part in both width and length direction has a telescopic form 8. The activation means 7 is here disclosed as an electrical linear actuator. But other types of actuators could have been selected as well. The enclosure illustrated in FIG. 4a and FIG. 4b. illustrates a closed configuration of the framework. The enclosure is in the closed configuration hoisted from the ground and the rotor blade can enter the enclosure from the tip. FIG. 4a illustrates a small framework 2, where the frame parts 5 are shorter because the telescopic form is in its compact form. In FIG. 4b are the telescopic part of the frame part in the extended form and the frame parts 5 are longer and a framework with a bigger size is hereby established. The actuation means 7 can narrow and enlarge the size of the framework and thereby the enclosure depending on the outer dimension of the rotor blade and the enclosure can at all time take the most favorable volume/size rapidly and without the need of lowering the enclosure to the ground in order to make the change in size.

Figure 5A:
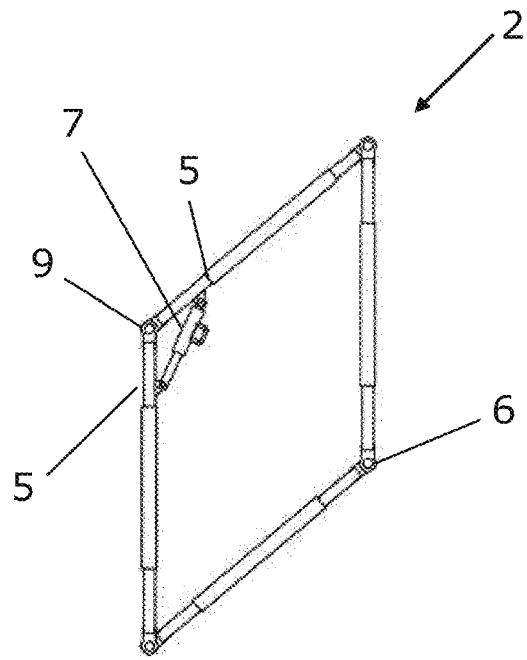
FIGS. 5a and 5b Show schematic illustrations of an embodiment with pivotable connection.
Figure 5B:
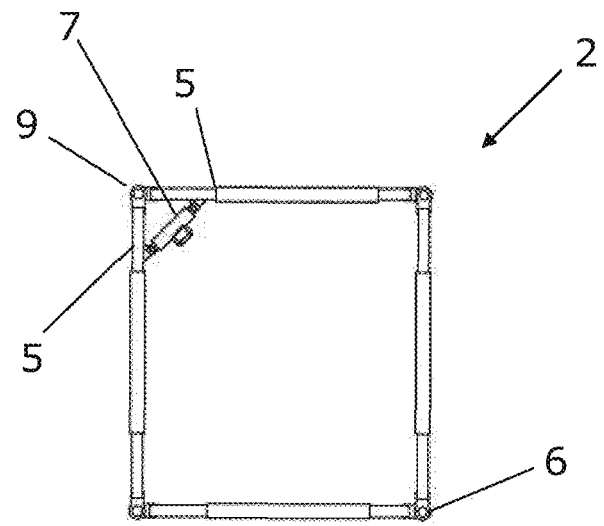

FIG. 5 illustrate another framework with four frame parts 5. FIG. 5a and FIG. 5b shows the framework from the top side and down, as seen from the top of a wind power plan and down. The illustration is without the roof and without walls in order to illustrate how the four frame parts 5 are connected and how the framework can change form.

The framework 2 takes here form as a parallelogram and the frame parts 5 are connected in connections 6. The connections are here illustrated as pivotable connections 9. The activation means 7 is here disclosed as an electrical linear actuator placed between two frame parts 5 in order to change the angle between the two frame parts 5. Other types of actuators could have been selected as well. The framework is illustrated in a closed configuration of the framework. The enclosure is in the closed configuration hoisted from the ground and the rotor blade can enter the enclosure from the tip. FIG. 5a and FIG. 5b illustrates the two extremes. The actuation means 7 can change the form of the framework and thereby the enclosure depending on the outer dimension of the rotor blade and the enclosure can at all time take the most favorable volume/size rapidly and without the need of lowering the enclosure to the ground in order to make the change in size.

Figure 6A:
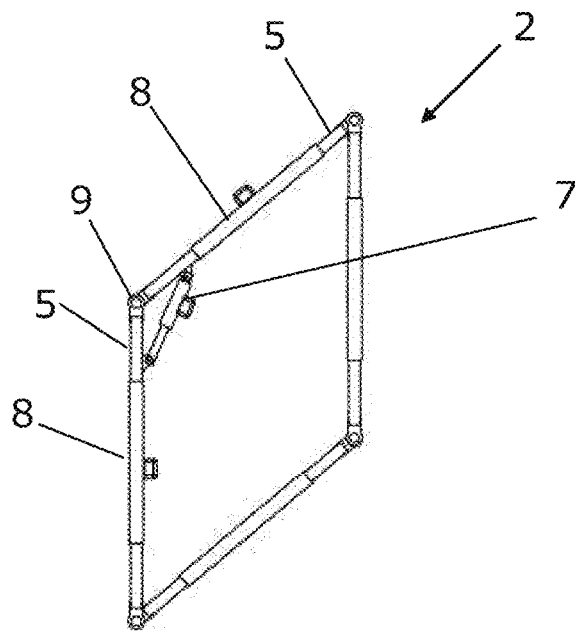
FIGS. 6a and 6b Show schematic illustrations of an embodiment with pivotable connection and frame parts having telescopic form.
Figure 6B:
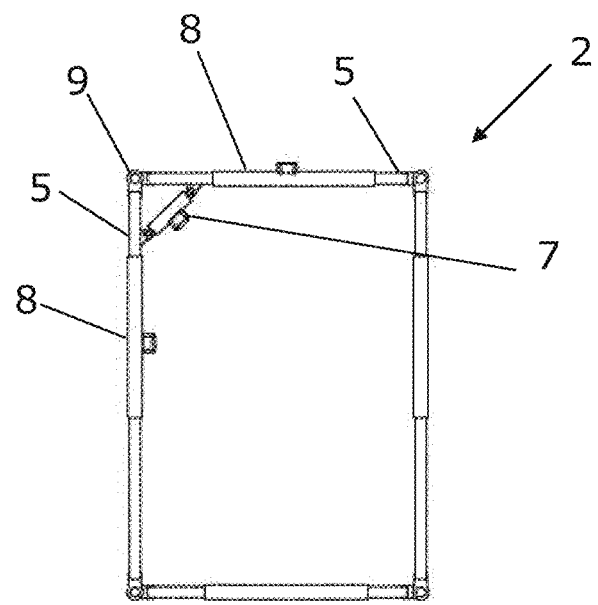

FIG. 6 illustrate another embodiment of a framework with four frame parts 5. FIG. 6a and FIG. 6b are a combination of the framework illustrated in FIG. 4 and FIG. 5. The framework 2 is here illustrated with pivotable connections 9 and with frame parts 5 having telescopic form 8. With this type of framework with both pivotable connection 9 and telescopic frame parts 8 is it possible to both change size and form of the framework.

FIG. 6a illustrate a small framework 2 where the frame parts 5 are shorter due to the situation that the telescopic form is in its compact form. In FIG. 6b are the telescopic part of the frame parts in the extended form and the frame parts 5 are longer and a framework with greater size is hereby established. The actuation means 7 can narrow and enlarge the size of the framework and thereby the enclosure depending on the outer dimension of the rotor blade and the enclosure can at all time take the most favorable volume/size/form rapidly and without the need of lowering the enclosure to the ground in order to make the change in size.

Figure 7A:
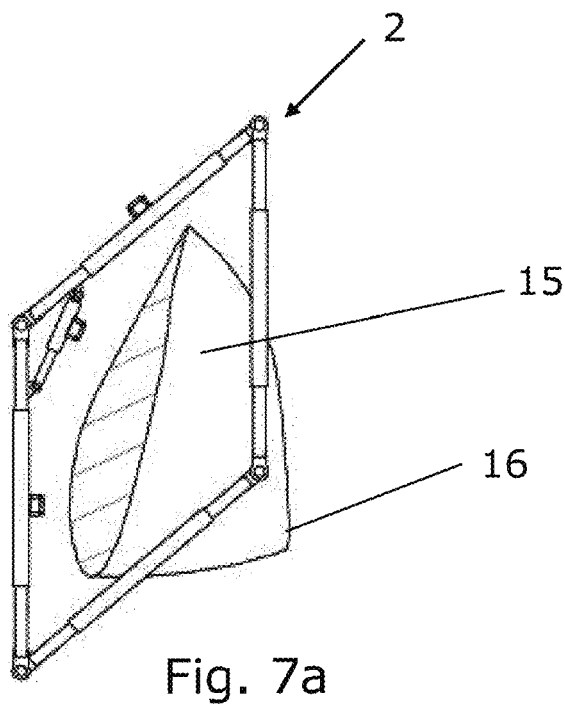
FIGS. 7a and 7b Show schematic illustrations of an embodiment with pivotable connection and frame parts having telescopic form illustrated with a rotor blade.
Figure 7B:
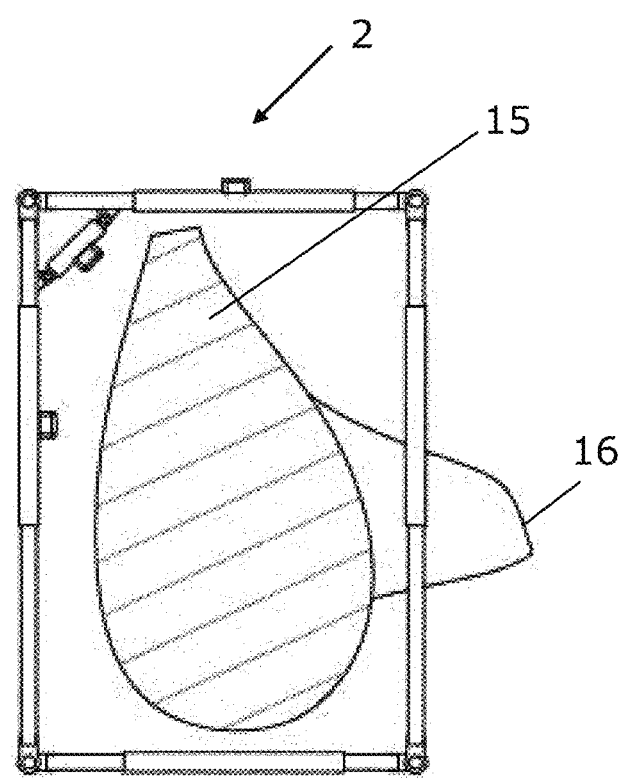

FIG. 7 illustrate the same framework as disclosed in FIG. 6. The only difference is that the framework as disclosed in FIG. 6a and FIG. 6b is visualized with a rotor blade 15 enclosed by the framework 2. FIG. 7a illustrate the optimal form of the framework in the situation where the enclosure is used at the tip 16 of the rotor blade 15, where FIG. 7b disclose the framework when the enclosure is used in the area of the rotor blade 15 where the blade has the greatest circumference, this is typical at the root end, or in the area between the root and the tip, typical closes to the root. The rotor blade illustrated is pre-bent. This dimension change together with the sophisticated shape can be handled with the enclosure by activation a change in the framework, with activations of the telescopic form of the frame parts and the pivotable connection of the frame parts. Hereby can the size and the volume enclosed by the enclosure be adapted to the outline of the rotor blade. This adaption of the volume, size and form secure that there is no need for lowering the enclosure to the ground in order to make the change in size when the enclosure is hoisted up and down the rotor blade.

Figure 8A:
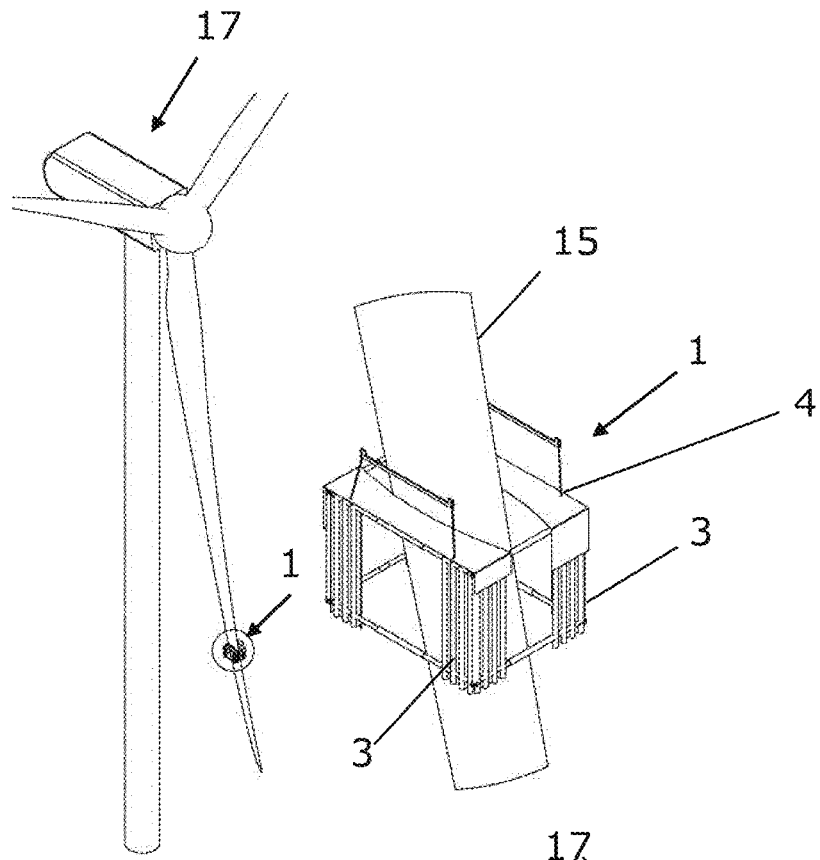
FIGS. 8a and 8b Show an embodiment with a rotor blade with the enclosure
Figure 8B:
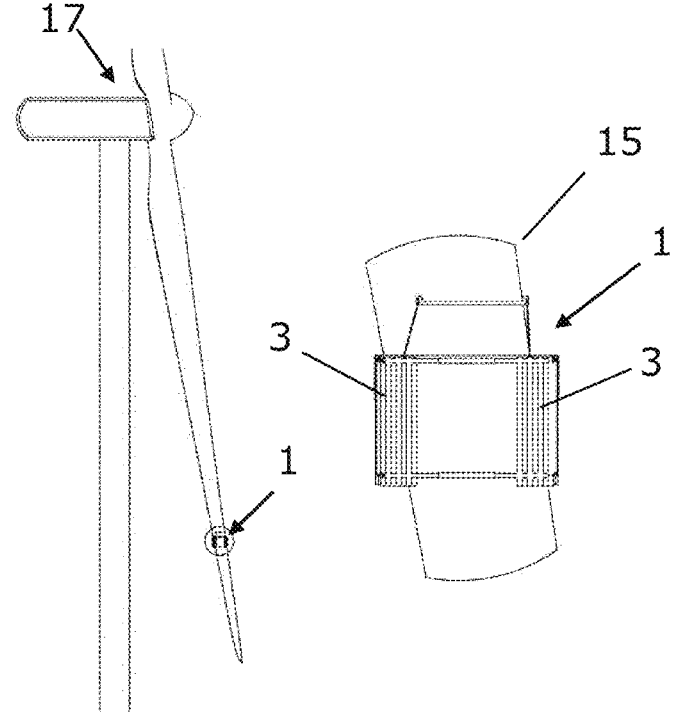

FIG. 8 illustrate a wind power plan 17 with an enclosure 1 placed around a part of the blade 15 and hoisted to a given position closer to the tip than to the rood of the blade. To the right is illustrated an upscale of the encircled part. FIG. 8a and FIG. 8b illustrate the same embodiment but disclosed from two different angles. The walls 3 are open and the blade 15 passing through the enclosure 1 is visible. The roof 4 is partly closed. The size and the volume enclosed by the enclosure is adapted to the outline of the rotor blade 15. When the service or repair is finished at a given place at the blade will the enclosure be hoisted up or down depending on the work need to be done. The enclosure can manage the dimension change and the sophisticated shape of the blade by activation a change in the framework. By activations of the telescopic form of the frame parts and/or the pivotable connection of the frame parts will the size and the volume enclosed by the enclosure be adapted to the outline of the rotor blade.

Figure 9A:
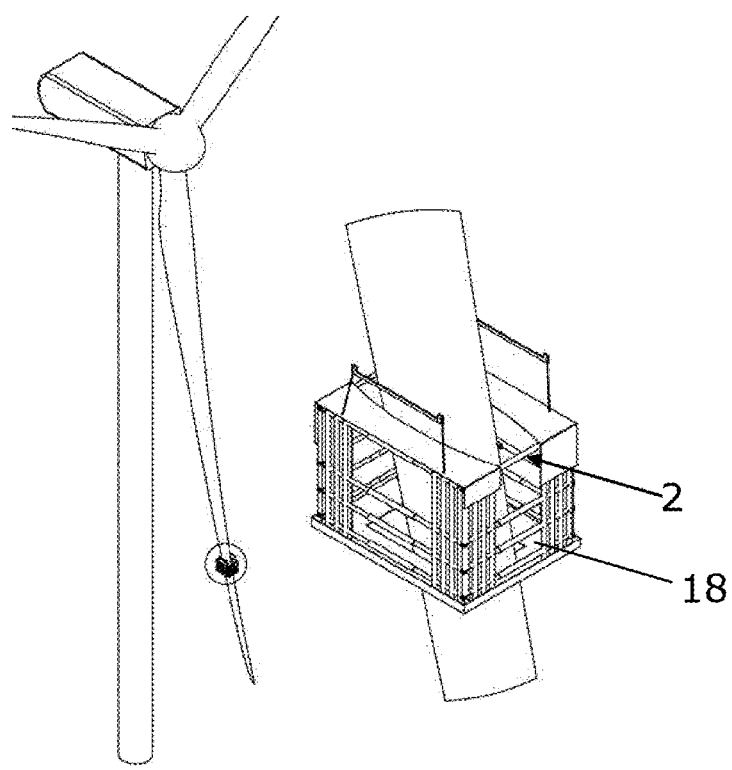
FIGS. 9a and 9b Show an embodiment with enclosure integrated with platform.
Figure 9B:
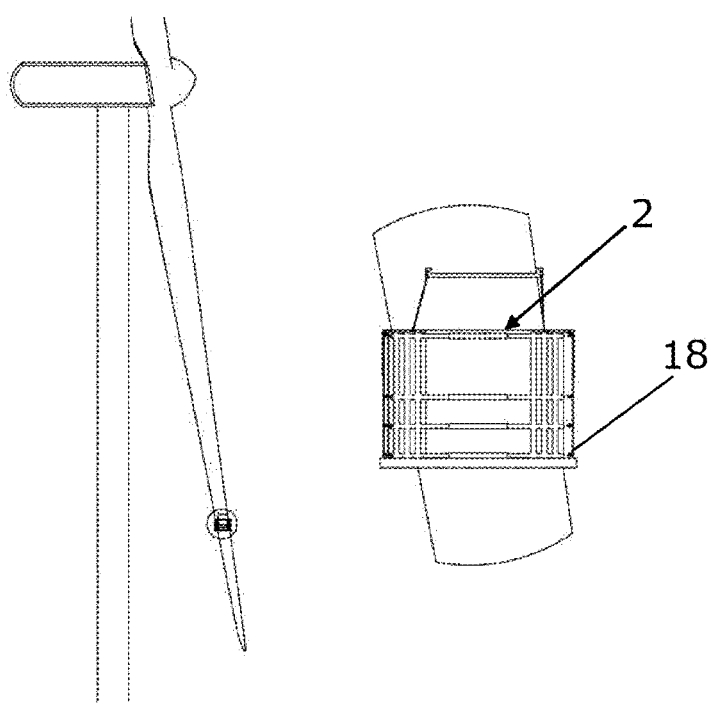

FIG. 9 illustrate an enclosure of the same type as illustrated in FIG. 8 but here does the enclosure also comprising a service platform 18. The platform 18 is connected to the framework 2. The enclosure and platform are here sharing activations means and the activation means is controlled by a common controller. A service technician can in an easy way hoister the enclosure with the platform up and down depending of the work to be done and the enclosure and platform will change form and size depending on the change in the framework.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A temporary enclosure for at least a part of a rotor blade connected to a wind power plant having a tower and a rotor top part, the enclosure comprising;
   a framework;
   one or more walls directly attached to said framework; and
   a roof;
   wherein said roof is directly attached to said framework and extends from said framework towards said blade, wherein said walls stretch about said framework and define a volume enclosed below the roof, and wherein said framework comprises one or more frame parts, a connection configured to connect the one or more frame parts and one or more activation means for activating a change in the framework whereby the volume enclosed by said walls changes.

2. The temporary enclosure according to claim 1, wherein at least one frame part has a telescopic form.

3. The temporary enclosure according to claim 1, wherein the framework comprises at least two frame parts.

4. The temporary enclosure according to claim 1, wherein at least one connection is a pivotable connection.

5. The temporary enclosure according to claim 1, wherein the framework comprises at least four frame parts.

6. The temporary enclosure according to claim 1, wherein the framework comprises at least four frame parts and wherein at least four of the frame parts have a telescopic form in order to change both the length and the width of the framework.

7. The temporary enclosure according to claim 1, wherein the framework comprises at least one frame part that can be divided into two sub-frame parts and the sub-frame parts can be moved away from each other and the framework can be opened.

8. The temporary enclosure according to claim 1, wherein at least one of the connections of frame parts can be disconnected, and the framework can be opened.

9. The temporary enclosure according to claim 1, wherein the activations means is an actuator.

10. The temporary enclosure according to claim 1, wherein at least one wall is movable.

11. The temporary enclosure according to claim 1, wherein the enclosure comprises more than one wall and that each wall has its own frame part.

12. The temporary enclosure according to claim 1, wherein the enclosure comprises a platform.

13. The temporary enclosure according to 12, wherein the platform is connected to the framework.

14. The temporary enclosure according to claim 12, wherein the platform and the framework share activation means.

15. The temporary enclosure according to claim 1, wherein a plurality of the one or more activation means are controlled by a common controller.

16. The temporary enclosure according to claim 2, wherein the framework comprises at least two frame parts.

17. The temporary enclosure according to claim 2, wherein at least one connection is a pivotable connection.

18. The temporary enclosure according to claim 3, wherein at least one connection is a pivotable connection.

19. The temporary enclosure according to claim 1, wherein the walls are attached to said framework at a bottom frame part and at an upper frame part.

20. A temporary enclosure for at least a part of a rotor blade connected to a wind power plant having a tower and a rotor top part, the enclosure comprising;

a framework having bottom frame parts and top frame parts;

one or more walls attached to said top frame parts of the framework and extending from said top frame parts toward said bottom frame parts; and a roof extending from said top frame parts of the framework towards said blade, wherein said walls extend about said framework and define a volume enclosed below the roof, and wherein said framework further comprises a connection configured to connect the one or more frame parts and one or one or more activation means for activating a change in the framework whereby the volume enclosed by said walls changes.

21. The temporary enclosure according to claim 20, wherein at least one of said walls is attached to said framework at said bottom frame part.

* * * * *